(12) United States Patent
Jones

(10) Patent No.: US 10,703,251 B1
(45) Date of Patent: Jul. 7, 2020

(54) MAGNETIC TIE-DOWN HOOK

(71) Applicant: Charles Jones, Auburn, GA (US)

(72) Inventor: Charles Jones, Auburn, GA (US)

( * ) Notice: Subject to any disclaimer, the term of this patent is extended or adjusted under 35 U.S.C. 154(b) by 0 days.

(21) Appl. No.: 16/798,631

(22) Filed: Feb. 24, 2020

Related U.S. Application Data

(60) Provisional application No. 62/853,420, filed on May 28, 2019.

(51) Int. Cl.
| | | |
|---|---|---|
| *B60P 7/08* | (2006.01) | |
| *B60P 7/18* | (2006.01) | |
| *B60P 7/13* | (2006.01) | |
| *B60R 9/06* | (2006.01) | |
| *B60P 7/10* | (2006.01) | |
| *B63B 25/28* | (2006.01) | |
| *B63B 21/04* | (2006.01) | |
| *B63B 25/00* | (2006.01) | |
| *B63B 25/22* | (2006.01) | |

(52) U.S. Cl.
CPC .............. *B60P 7/08* (2013.01); *B60P 7/0807* (2013.01); *B60P 7/0823* (2013.01); *B60P 7/0869* (2013.01); *B60P 7/10* (2013.01); *B60P 7/13* (2013.01); *B60P 7/18* (2013.01); *B60R 9/06* (2013.01); *B63B 21/04* (2013.01); *B63B 25/002* (2013.01); *B63B 25/22* (2013.01); *B63B 25/28* (2013.01)

(58) Field of Classification Search
CPC .. B60P 7/08; B60P 7/0823; B60P 7/18; B60P 7/0807; B60P 7/13; B60P 7/10; B60P 7/0869; B63B 21/04; B63B 25/28; B63B 25/002; B63B 25/22; B60R 9/06
USPC ..................... 410/50, 97, 100, 102, 106, 116
See application file for complete search history.

(56) References Cited

U.S. PATENT DOCUMENTS

| | | | |
|---|---|---|---|
| 5,800,106 A * | 9/1998 | Miller ................... | B60P 7/0807 410/116 |
| 8,870,249 B2 | 10/2014 | Bruce et al. | |
| 9,725,028 B1 | 8/2017 | Etzkorn | |
| 9,878,653 B2 | 1/2018 | Roe | |
| 2005/0286986 A1* | 12/2005 | Thomson ................. | B60P 7/15 410/117 |
| 2006/0177282 A1 | 8/2006 | Blosser | |
| 2013/0322981 A1 | 12/2013 | Root | |

* cited by examiner

*Primary Examiner* — Stephen T Gordon
(74) *Attorney, Agent, or Firm* — Boudwin Intellectual Property; Daniel Boudwin

(57) ABSTRACT

A magnetic tie-down hook. The magnetic tie-down hook includes a body having a first portion and a second portion, wherein the second portion includes a curved hook. A magnet is affixed to a terminal end of the first portion. The second portion includes an annular body having an opening therethrough. A coating is disposed over the entirety of the body, wherein the coating includes a phosphorescent material. In some embodiments, a strap is affixed to the second portion through the opening at a first end of the strap.

20 Claims, 3 Drawing Sheets

MAGNETIC TIE-DOWN HOOK

CROSS REFERENCE TO RELATED APPLICATIONS

This application claims the benefit of U.S. Provisional Application No. 62/853,420 filed on May 28, 2019. The above identified patent application is herein incorporated by reference in its entirety to provide continuity of disclosure.

BACKGROUND OF THE INVENTION

The present invention relates to tie-down hooks. More particularly, the present invention pertains to tie-down hooks having a magnet thereon, for further securing the tie-down hook to a vehicle.

Many people transport goods and equipment on a variety of vehicles, often having flatbeds. Without proper securement, such goods and equipment can slide about the vehicle. If the goods or equipment are particularly fragile or delicate, such unsecured movement can result in damage, which can be costly to repair. Typically, in order to secure containers to the vehicle, tie-down straps are used. However, traditional tie-downs can be difficult to utilize as the tie-downs often do not stay in place. This can result in repeated stops to reapply the tie-downs to ensure that the shipment is not damaged in transit. Most transportation vehicles include ferrous materials in their frames, which can be utilized to provide additional adhesion. Additionally, individuals must often tie down goods in darkened conditions, such as in the evening or within an enclosed cargo bay of a vehicle. Properly visualizing the tie-down bracket and hook in such conditions can be particularly difficult. Therefore, a tie-down hook system that includes a magnet thereon to further secure the tie-down hook system to an existing ferrous vehicle frame and includes a phosphorescent coating to aid in visibility in low-light conditions is desired.

In light of the devices disclosed in the known art, it is submitted that the present invention substantially diverges in design elements from the known art and consequently it is clear that there is a need in the art for an improvement to existing tie-down hooks. In this regard, the instant invention substantially fulfills these needs.

SUMMARY OF THE INVENTION

In view of the foregoing disadvantages inherent in the known types of tie-down hooks now present in the known art, the present invention provides a tie-down hook wherein the same can be utilized for providing convenience for the user when securing a tie-down hook to a vehicle and visualizing the location of the tie-down hook in low-light conditions.

The present system comprises a body having a first portion and a second portion wherein the first portion comprises a curved hook. A magnet is affixed to a terminal end of the first portion. The second portion includes an annular body having an opening therethrough. A coating is disposed over the entirety of the body, wherein the coating comprises a phosphorescent material. In some embodiments, a strap having a first end opposite a second end is affixed to the second portion through the opening at the first end thereof. The strap further comprises a length adjustment mechanism thereon configured to selectively adjust a linear length of the strap. In other embodiments, a distal end of the second portion is affixed to a proximal end of the second portion, defining a closed loop.

In some embodiments, the magnet is affixed to the terminal end coaxially. In other embodiments, the magnet comprises a greater diameter than that of the first portion, such that the magnet prevents the first portion from sliding off of an attachment point. In another embodiment, the magnet comprises an axial magnet, such that opposing poles of the magnet are disposed on each face thereof. This arrangement allows the magnet to readily secure to a vehicle frame when the first portion is hooked about an attachment point. In some embodiments, the first portion is magnetized along a length thereof, such that the first portion magnetically secures to the attachment point of a vehicle.

In yet another embodiment, the coating comprises a rubber material to minimize damage to a vehicle or other area surrounding the attachment point. In some embodiments, the coating further comprises a reflective material configured to increase visibility in low-light conditions, thereby allowing a user to readily visualize the tie-down hook.

In some embodiments, the strap further comprises a loop on each of the first and second ends thereof, such that the first and second ends secure about the second portion of the body through the opening. In other embodiments, the length adjustment mechanism comprises a ratcheting tension device. In another embodiment, a second body is affixed to the second end of the strap, wherein the second body is identical to the body. In this manner, the pair of tie-down hook bodies allow the user to removably secure the strap over a container on opposing sides of a vehicle.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
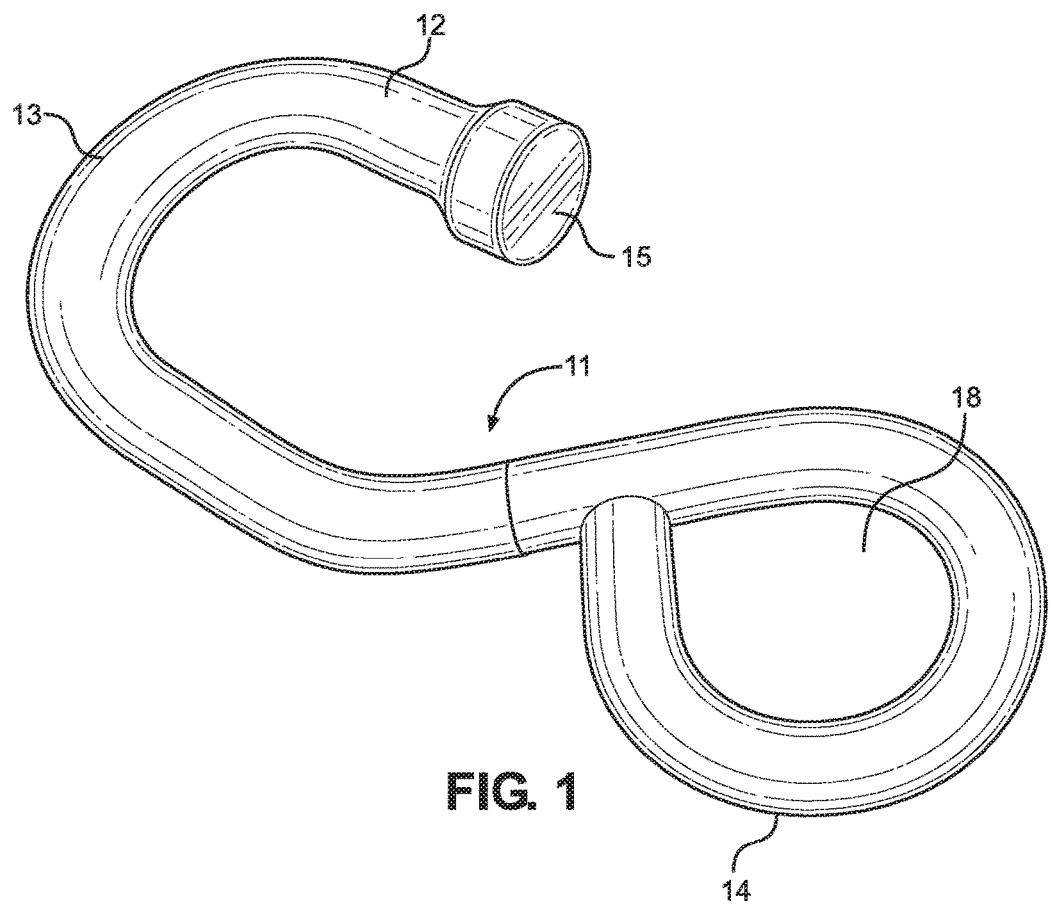
FIG. 1 shows a perspective view of an embodiment of the magnetic tie-down hook.

Reference is made herein to the attached drawings. Like reference numerals are used throughout the drawings to depict like or similar elements of the magnetic tie-down hook. The figures are intended for representative purposes only and should not be considered to be limiting in any respect.

Figure 3:
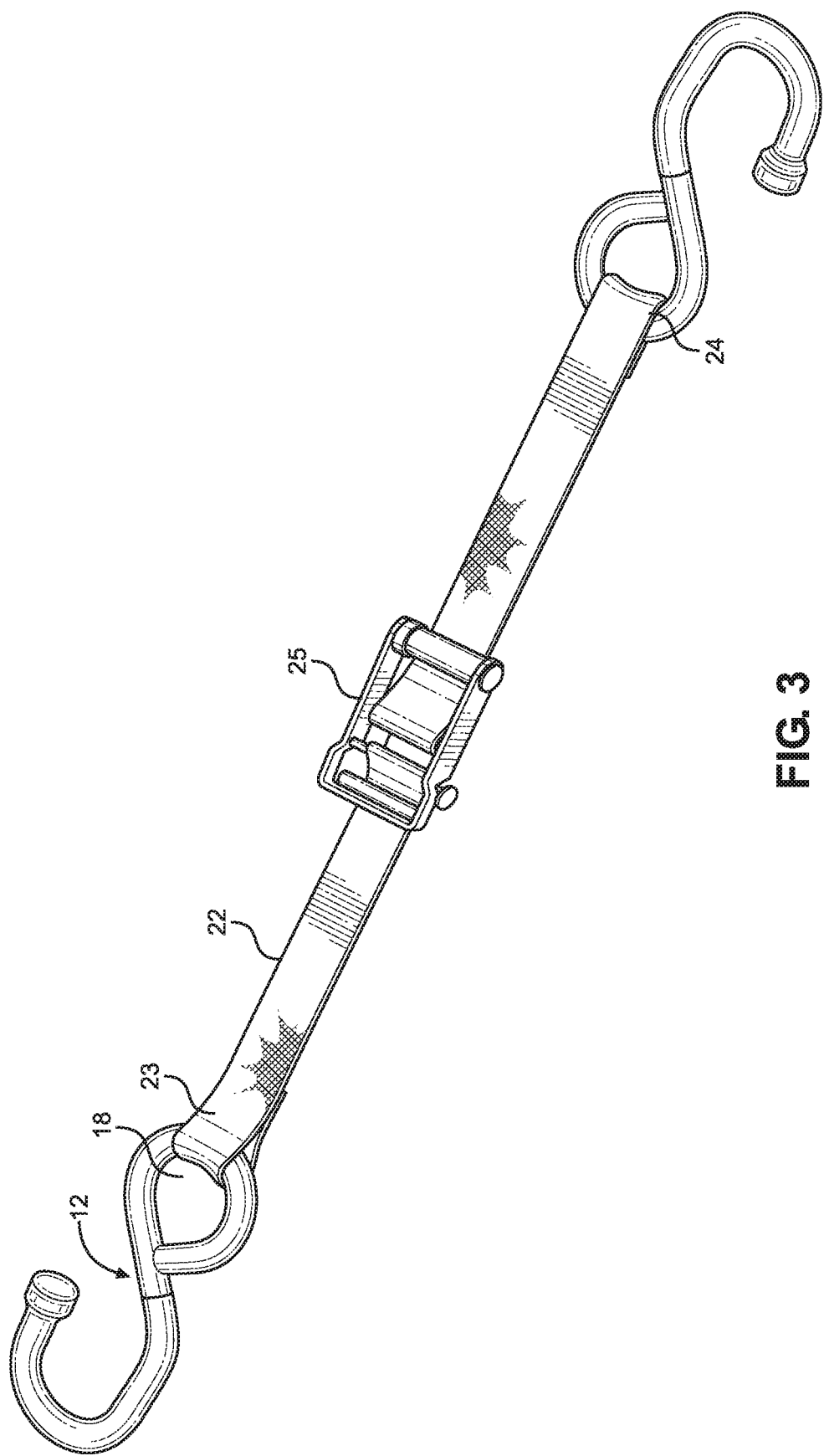
FIG. 3 shows a perspective view of an embodiment of the magnetic tie-down hook attached to a strap.

Referring now to FIG. 1, there is shown a perspective view of an embodiment of the magnetic tie-down hook. The magnetic tie-down hook 11 comprises a body 12 having a first portion 13 opposite a second portion 14. The first portion 13 comprises a curved hook configured to secure about an attachment point of a vehicle, such as a bracket, cleat, or the like. In the shown embodiment, the second portion 14 comprises an annular member having an opening 18 therethrough. The opening 18 is configured to removably secure a strap (as shown in FIG. 3, 22) therethrough. In the shown embodiment, the body 12 comprises a unitary structure having a rigid and durable form, such that the body 12 resists deformation upon the application of external forces, such as those that occur during shipments. The magnetic tie-down hook 11 can be utilized to removably secure to a vehicle to ensure a container, pallet, or other such shipment is retained in a desired position during transport.

A magnet 15 is affixed to a terminal end of the first portion 13, wherein the magnet 15 is configured to removably secure the first portion 13 to a ferrous surface. For example, many vehicle frames comprise ferrous materials which can be utilized to allow the magnet 15 to removably secure to existing vehicle frames to provide additional support and securement to the magnetic tie-down hook 11. The magnet 15 further ensures that the magnetic tie-down hook 11 does not shift during transportation of goods. In some embodiments, the magnet 15 comprises an axial magnet 15, such that the poles are disposed on each opposing face thereof. In this manner, the surface area of the magnet 15 in contact with a ferrous surface is increased, providing additional securement. In some embodiments, the magnet 15 is configured to removably secure to the vehicle frame in the vicinity of the attachment point of the vehicle, whereas in alternate embodiments, the entirety of the first portion 13 is magnetized to removably secure to the attachment point. In another embodiment, the entire body 12 is magnetized such that the first portion 13 comprises a first pole of the magnet and the second portion 14 comprises a second pole. In this manner, the first portion 13 can readily secure to the attachment point, allowing a user to expeditiously secure a container or pallet to be delivered. In the shown embodiment, the first and second portions 13, 14 are delineated by differing external appearance, such that a user can readily identify that each of the first and second portions 13, 14 as opposing magnetic poles.

Figure 2:
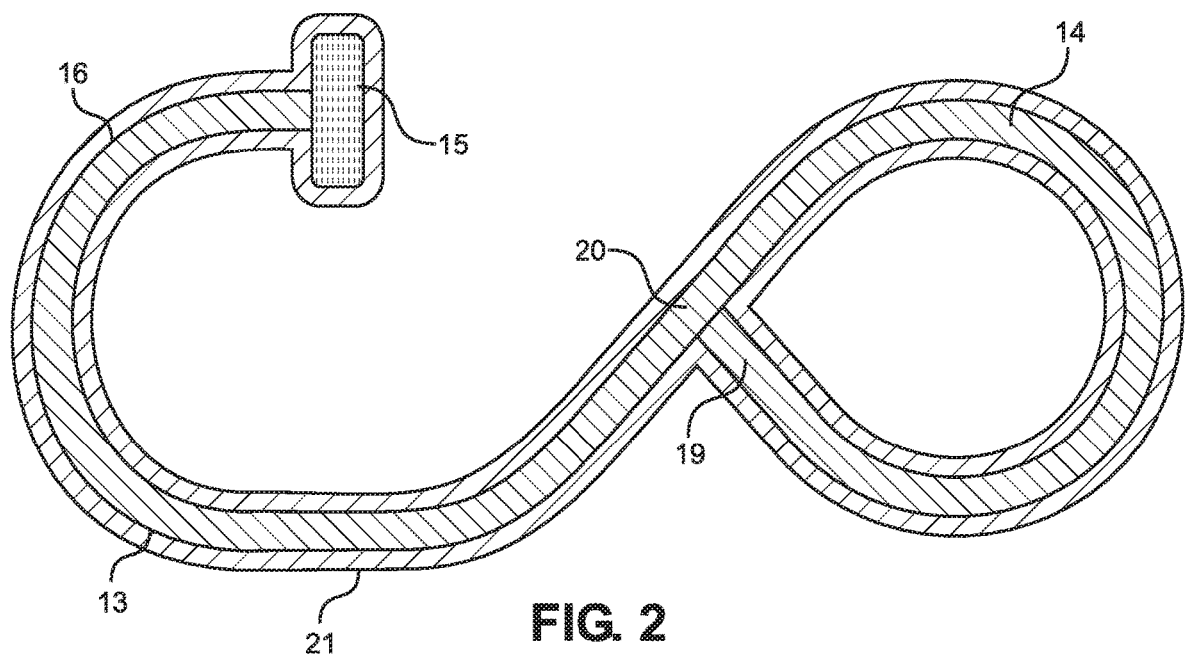
FIG. 2 shows a cross-sectional view of an embodiment of the magnetic tie-down hook.

Referring now to FIG. 2, there is shown a cross-sectional view of an embodiment of the magnetic tie-down hook. In the illustrated embodiment the body 12 comprises a unitary structure enshrouded by a covering 21. The magnet 15 is affixed at a terminal end 16 of the first portion 13. In the shown embodiment, the magnet 15 is affixed to the first portion 13 coaxially, providing a user with convenience when ascertaining the location of the magnet 15 when securing the magnetic tie-down hook to an attachment point. In this manner, the magnet 15 can be readily placed against a vehicle frame without visualizing the attachment point. Furthermore, in the shown embodiment, the magnet 15 comprises a diameter greater than that of the first portion 13, such that the surface area in contact with a vehicle frame can be increased. In the shown embodiment, the second portion 14 comprises a closed loop defined by a distal end 19 of the second portion 14 being affixed to a proximal end 20 of the second portion 14. In this embodiment, the distal end 19 is permanently affixed to the proximal end 20, such that the second portion 14 retains the shape of the closed loop upon the application of external forces, ensuring that the magnetic tie-down hook does not fail and release the strap secured thereto.

In the shown embodiment, the covering 21 is disposed over an entirety of the body, such that no portion of the body is exposed. In some embodiments, the covering 21 comprises a durable and compressible material such that the impact forces generated thereby are reduced. In this manner, the magnetic tie-down hook does not cause damage to the vehicle due to shifting during transport. In such embodiments, the covering 21 can comprise a rubberized material, however alternate durable and compressible materials are contemplated. In some embodiments, the covering 21 further comprises a phosphorescent material therein, such that the covering 21 illuminates under low-light conditions. In some such embodiments, the phosphorescent nature of the covering 21 is photo-sensitive such that exposure to light charges the covering 21 for illumination during low-light conditions. In alternate embodiments, the covering 21 further comprises a reflective surface, such that external light sources impacting the covering 21 are reflected towards the external light source. In this manner, the magnetic tie-down hook can be properly visualized in low-light conditions, such as evening roadway travel. In some embodiments, the reflective surface comprises reflective flakes embedded within the material of the covering 21.

Referring now to FIG. 3, there is shown a perspective view of an embodiment of the magnetic tie-down hook attached to a strap. In the illustrated embodiment, the magnetic tie-down hook comprises a strap 22 affixed to the body 12 through the opening 18 of the second portion thereof. The strap 22 comprises a first end 23 opposite a second end 24, wherein each of the first and second ends 23, 24 are configured to removably secure to the body 12 via the opening 18. In the shown embodiment, the first and second ends 23, 24 each comprise a loop. In the illustrated embodiment, each loop is defined by the first end 23 and the second end 24 being folded over the strap 22 and affixed thereto. In some embodiments, the first and second ends 23, 24 can be removably secured to the strap 22, such that the magnetic tie-down hook can be interchanged with another if necessary. In the shown embodiment, a body 12 can be secured at each of the first and second ends 23, 24 of the strap 22, such that a container can be retained in place via tension. In the illustrated embodiment, the strap 22 further comprises a length adjustment device 25 configured to selectively adjust a linear length of the strap 22. In this manner, the user can secure the strap 22 about a container or pallet to be transported such that the container is retained via tension. In the shown embodiment, the length adjustment device 25 comprises a ratcheting tension device, however alternate length adjusting mechanisms are contemplated, such as buckles and the like.

Figure 4:
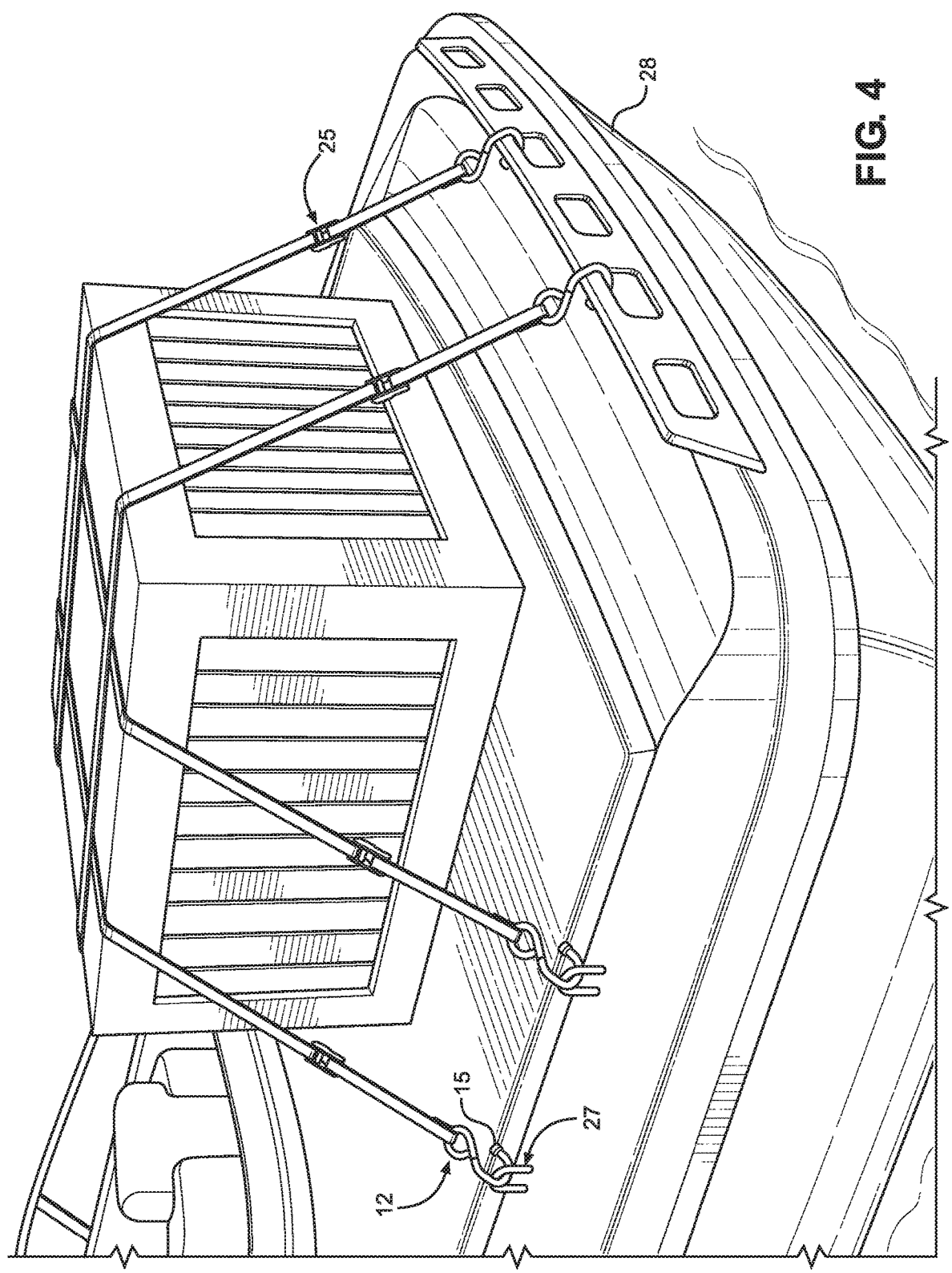
FIG. 4 shows a perspective view of an embodiment of the magnetic tie-down hook in use.

Referring now to FIG. 4, there is shown a perspective view of an embodiment of the magnetic tie-down hook in use. In one exemplary use, a container or pallet is placed on a bed of a vehicle 28. One or more magnetic tie-down hooks are secured to the vehicle 28 via inserting the first portion of the body 12 through an attachment point, such as a bracket or cleat. The magnet 15 is placed against the ferrous surface of the vehicle 28, whether that surface is a portion of the vehicle frame or the attachment point itself, such that the body 12 is further secured to the vehicle. The length of the strap extending over the container or pallet can then be adjusted via the length adjustment device 25 until the container or pallet is retained on the vehicle 28 via tension forces. During transport, any shifting caused by movement of the vehicle 28 is minimized by the tension, while the vehicle 28 is protected by the compressible covering over the body 12. In low-light conditions, such as in the evening or within an enclosed cargo bay, the phosphorescent covering illuminates allowing a user to accurately place and secure the magnetic tie-down hook to the vehicle 28.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A magnetic tie-down hook, comprising:
a body having a first portion and a second portion;
wherein the first portion comprises a curved hook;
a magnet affixed to a terminal end of the first portion;
wherein the second portion comprises an annular body having an opening therethrough;
a coating disposed over the entirety of the body;
wherein the coating comprises a phosphorescent material.

2. The magnetic tie-down hook of claim 1, wherein the magnet is affixed to the terminal end coaxially.

3. The magnetic tie-down hook of claim 1, wherein the magnet comprises a greater diameter than that of the first portion.

4. The magnetic tie-down hook of claim 1, wherein the magnet comprises an axial magnet.

5. The magnetic tie-down hook of claim 1, wherein a distal end of the second portion is affixed to a proximal end of the second portion, defining a closed loop.

6. The magnetic tie-down hook of claim 1, wherein the coating comprises a rubber material.

7. The agnetic tie-down hook of claim 1, wherein the coating further comprises a reflective material configured to increase visibility in low-light conditions.

8. The magnetic tie-down hook of claim 1, wherein the first portion of the body is magnetized.

9. A magnetic tie-down hook, comprising:
a body having a first portion and a second portion;
wherein the first portion comprises a curved hook;
a magnet affixed to a terminal end of the first portion;
wherein the second portion comprises an annular body having an opening therethrough;
a coating disposed over the entirety of the body;
wherein the coating comprises a phosphorescent material;
a strap having a first end and a second end;
wherein the first end of the strap is affixed to the second portion through the opening.

10. The agnetic tie-down hook of claim 9, wherein the magnet is affixed to the terminal end coaxially.

11. The magnetic tie-down hook of claim 9, wherein the magnet comprises a greater diameter than that of the first portion.

12. The magnetic tie-down hook of claim 9, wherein the magnet comprises an axial magnet.

13. The magnetic tie-down hook of claim 9, wherein a distal end of the second portion is affixed to a proximal end of the second portion, defining a closed loop.

14. The magnetic tie-down hook of claim 9, wherein the coating comprises a rubber material.

15. The magnetic tie-down hook of claim 9, wherein the coating further comprises a reflective material configured to increase visibility in low-light conditions.

16. The magnetic tie-down hook of claim 9, wherein the strap further comprises a length adjustment mechanism thereon configured to selectively adjust a linear length of the strap.

17. The magnetic tie-down hook of claim 16, wherein the length adjustment mechanism comprises a ratcheting tension device.

18. The magnetic tie-down hook of claim 9, further comprising a second body identical to the body, wherein the second body is affixed to the strap at the second end thereof.

19. The magnetic tie-down hook of claim 9, wherein each of the first end of the strap and the second end of the strap comprise a loop thereon, the loop configured to secure about the second portion via the opening.

20. The magnetic tie-down hook of claim 9, wherein the first portion of the body is magnetized.

* * * * *